US007982170B2

(12) United States Patent
Hattori et al.

(10) Patent No.: US 7,982,170 B2
(45) Date of Patent: Jul. 19, 2011

(54) MICROSCOPE SYSTEM

(75) Inventors: Toshiyuki Hattori, Hachioji (JP);
Yusuke Yamashita, Hino (JP); Yasunari Matsukawa, Saitama (JP); Masaharu Tomioka, Hino (JP)

(73) Assignee: Olympus Corporation, Tokyo (JP)

( * ) Notice: Subject to any disclaimer, the term of this patent is extended or adjusted under 35 U.S.C. 154(b) by 15 days.

(21) Appl. No.: 12/562,346

(22) Filed: Sep. 18, 2009

(65) Prior Publication Data

US 2010/0083410 A1    Apr. 1, 2010

(30) Foreign Application Priority Data

Sep. 29, 2008 (JP) ................................. 2008-250823

(51) Int. Cl.
*G01N 21/64* (2006.01)
(52) U.S. Cl. ................... 250/201.3; 250/484.4; 359/393
(58) Field of Classification Search ............... 250/201.3, 250/484.4; 359/368, 385, 391, 393
See application file for complete search history.

(56) References Cited

U.S. PATENT DOCUMENTS

| 6,101,265 | A | 8/2000 | Bacus et al. | |
|---|---|---|---|---|
| 7,220,974 | B2* | 5/2007 | Hattori et al. | 250/458.1 |
| 7,238,934 | B2 | 7/2007 | Motomura | |
| 7,382,532 | B2* | 6/2008 | Okugawa | 359/395 |
| 7,436,590 | B2* | 10/2008 | Hattori | 359/385 |
| 2003/0058440 | A1* | 3/2003 | Scott et al. | 356/318 |
| 2007/0177142 | A1* | 8/2007 | Tsuyuki et al. | 356/318 |
| 2009/0153955 | A1* | 6/2009 | Nakano | 359/385 |
| 2009/0185268 | A1* | 7/2009 | Harada et al. | 359/388 |
| 2009/0250629 | A1* | 10/2009 | Kim et al. | 250/459.1 |
| 2010/0083410 | A1* | 4/2010 | Hattori et al. | 850/1 |

FOREIGN PATENT DOCUMENTS

| JP | 2001-519944 A | 10/2001 |
|---|---|---|
| JP | 2005-202087 A | 7/2005 |

* cited by examiner

*Primary Examiner* — John R Lee
(74) *Attorney, Agent, or Firm* — Holtz, Holtz, Goodman & Chick, PC (57) ABSTRACT

A microscope system comprises a microscope including a motorized stage on which is mounted a container containing a specimen and which can adjust the position of the container, a scanner scanning laser light radiated onto the specimen, an objective lens focusing the scanned laser light, an image-acquisition unit acquiring a specimen image by detecting fluorescence produced in the specimen, and a dark box containing these components; a storage unit storing the mounting position of the container on the motorized stage; an image-acquisition-position setting unit setting acquisition positions of partial images of the inside of the container, on the basis of the stored mounting position of the container; a control section controlling the microscope so as to acquire the partial images for each container on the basis of the set acquisition positions; and a map-image generating section arranging the partial images to generate a map image.

10 Claims, 6 Drawing Sheets

MICROSCOPE SYSTEM

BACKGROUND OF THE INVENTION

1. Field of the Invention

The present invention relates to a microscope system.

This application is based on Japanese Patent Application No. 2008-250823, the content of which is incorporated herein by reference.

2. Description of Related Art

In the related art, there is a known method for generating an image with a wide field of view, a so-called map image, by combining a plurality of neighboring partial images (for example, see Japanese Translation of PCT International Application, Publication No. 2001-519944). In Japanese Translation of PCT International Application, Publication No. 2001-519944, by associating a group of other partial images acquired at higher magnification with the map image, the location of the high-magnification images can be pinpointed from the map image.

However, a drawback with the method disclosed in Japanese Translation of PCT International Application, Publication No. 2001-519944 is that it takes time to generate the map image and a large storage capacity is required because it is necessary to acquire partial images over the entire observable region to generate the map image, thus acquiring partial images even in regions where a specimen does not exist. In particular, a laser-scanning microscope of the type that acquires images by scanning laser light suffers from the drawback that it is not possible to generate a map image quickly because it takes time to acquire images compared with a case where an image-acquisition device such as a CCD is used to acquire images of the specimen.

BRIEF SUMMARY OF THE INVENTION

The present invention provides a microscope system that is capable of rapidly generating a map image formed by combining multiple partial images.

One aspect of the present invention is a microscope system comprising a microscope including a motorized stage on which is mounted at least one container that contains a specimen and which can adjust the position of the container, a scanner that scans laser light radiated onto the specimen in the container mounted on the motorized stage, an objective lens that focuses the laser light scanned by the scanner onto the specimen, an image-acquisition unit that acquires an image of the specimen by detecting fluorescence produced in the specimen by laser light irradiation with the objective lens, and a dark box that contains these components; a storage unit that stores the mounting position of the container on the motorized stage; an image-acquisition-position setting unit that sets acquisition positions of partial images of the inside of the container, to be acquired by the image-acquisition unit, on the basis of the mounting position of the container stored in the storage unit; a control section that controls the microscope so as to acquire a plurality of the partial images for each container on the basis of the acquisition positions set by the image-acquisition-position setting unit; and a map-image generating section that arranges the plurality of partial images acquired for each container to generate a map image.

According to this aspect of the present invention, when at least one container that contains a specimen is mounted on the motorized stage, the image-acquisition-position setting unit sets the acquisition positions of the partial images according to the mounting positions of the containers, which are stored in the storage unit. The control section controls the microscope on the basis of the set acquisition positions to acquire a plurality of partial images of the inside of the container, for each container. In the microscope, the laser light scanned by the scanner is focused onto the specimen by the objective lens, and the fluorescence produced in the specimen is detected by the image-acquisition unit, thereby acquiring the partial images. Then, the map-image generating section arranges the plurality of acquired partial images, thereby generating a map image covering a larger field of view than the partial images.

In this case, according to one aspect of the present invention, because the image-acquisition-position setting unit sets the acquisition positions of the partial images according to the container mounting positions stored in the storage unit, it is possible to acquire only the partial images covering the required region inside the container, in the vicinity of the mounting position. As a result, it is possible to eliminate needless acquisition of partial images in regions outside the container, and to generate a map image in a short period of time and with reduced storage capacity.

In the aspect described above, the control section may control the microscope so as to perform a focusing operation at least once for each of the containers during acquisition of the partial images acquired by the image-acquisition unit.

By doing so, because the specimen is focused on at least one time for each container, it is possible to eliminate needless acquisition of partial images only in the focal plane where the specimen does not exist.

In the aspect described above, the image-acquisition-position setting unit may set the acquisition positions so as to acquire neighboring partial images in a sequence rotating in one direction from substantially the center of the container.

By doing so, because partial images are acquired in an expanding fashion from substantially the center of the container where the possibility of the specimen existing is high, it is possible to rapidly acquire a map image in which the specimen exists, even though partial images are not acquired in the entire region inside the container.

In the aspect described above, the motorized stage may have a plurality of motion axes that intersect each other, and the image-acquisition-position setting unit may set the acquisition positions so as to acquire neighboring partial images in directions intersecting the plurality of motion axes.

By doing so, when the motorized stage is operated to acquire neighboring partial images, it is possible to move the motorized stage on a plurality of motion axes simultaneously, and it is possible to shorten the distance moved on each motion axis and to reduce the moving time, thus enabling generation of a map image in a short period of time. For example, if there are motion axes in two orthogonal directions, when acquiring neighboring partial images in the directions of the motion axes, it is necessary to move on only one motion axis by a distance X. However, when acquiring neighboring partial images in a direction forming an angle of 45° relative to the two motion axes, it is sufficient to simultaneously move the motorized stage on the two motion axes by a distance $X/\sqrt{2}$ each, and it is thus possible to reduce the required time by about 30%.

In the aspect described above, when generating the map image of a multi-stained specimen, the control section may control the microscope so that after a plurality of the partial images are acquired at each container for one fluorochrome, partial images are acquired also for other fluorochromes at the acquisition positions of the partial images where fluorescence exists in the acquired partial images, and the map-image generating section may generate the map image by combining the partial images acquired for the plurality of fluorochromes.

By doing so, it is possible to eliminate needless acquisition of partial images in a region where the multi-stained image cannot be obtained, thus enabling generation of the map image in a short period of time.

In the aspect described above, the control section may control the microscope so as to acquire a plurality of groups of partial images at different focal positions of the objective lens in an optical axis direction, and the map-image generating section may generate the map image by combining the acquired plurality of groups of partial images.

By doing so, it is possible to generate a map image in which it is possible to recognize, at a glance, the position of a specimen that exists in different focal planes.

In the aspect described above, the control section may control the microscope so as to increase the depth of field during acquisition of the partial images for generating the map image.

By doing so, it is possible to generate a map image in which it is possible to recognize, at a glance, the position of a specimen that exists in different focal planes.

The present invention affords an advantage in that it is possible to rapidly generate a map image formed by combining multiple partial images.

DETAILED DESCRIPTION OF THE INVENTION

A microscope system 1 according to an embodiment of the present invention will be described below with reference to FIGS. 1 to 8.

Figure 1:
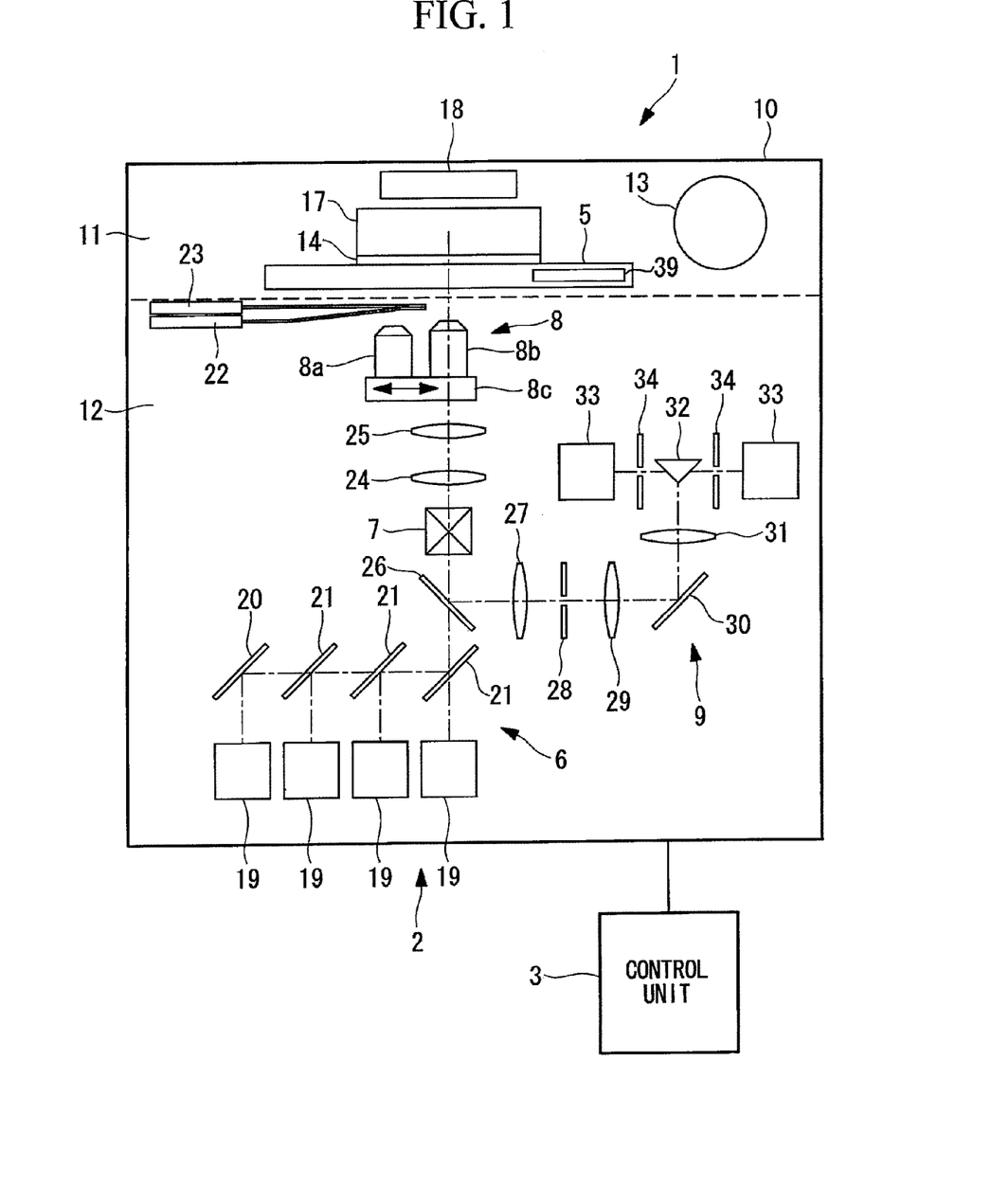
FIG. 1 is a block diagram showing a microscope system according to an embodiment of the present invention.

As shown in FIG. 1, the microscope system 1 according to this embodiment includes a laser scanning microscope 2 and a control unit (control section) 3 that controls the laser scanning microscope 2.

The laser scanning microscope 2 includes a motorized stage 5 on which a plurality of containers 4 (see FIG. 2) holding specimens are mounted and which moves the containers 4, a laser light source 6 that emits laser light, a scanner 7 that two-dimensionally scans the laser light from the laser light source 6, an objective lens 8 that focuses the laser light scanned by the scanner 7 onto a specimen, an image-acquisition unit 9 that acquires images of the specimen by detecting fluorescence produced in the specimen upon irradiation with the laser light from the objective lens 8, and a dark box 10 that accommodates these components.

The interior of the dark box 10 is partitioned into a first area 11 at the top, which contains the motorized stage 5, and a second area 12 located therebelow. A heater 13 is disposed in the first area 11 to adjust the temperature inside the first area 11 to prescribed culturing conditions (for example, 27° C.±0.5° C.).

A sample holder 14 mounted on the motorized stage 5 in an aligned state is disposed in the first area 11.

The motorized stage 5 is provided with three motors (not illustrated) and can move independently along three mutually orthogonal motion axes in the X, Y, and Z directions, thus allowing the mounted containers 4 to be moved three dimensionally.

Figure 2:
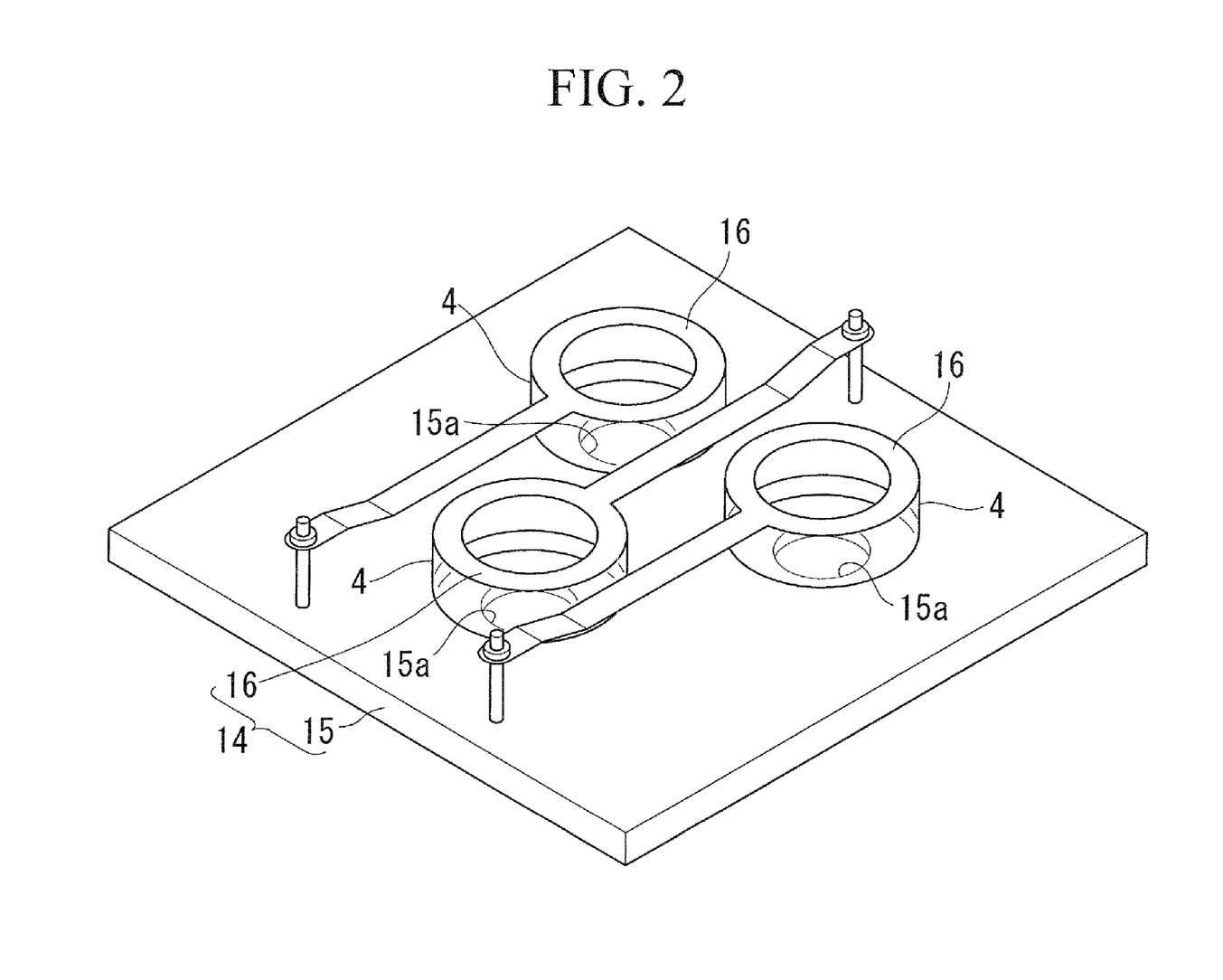
FIG. 2 is a perspective view showing an example of a sample holder in the microscope system in FIG. 1, as well as containers mounted on the sample holder.

As shown in FIG. 2, the sample holder 14 include a tabular plate portion 15 having through-holes 15a, and holder portions 16 that are located aligned with the through-holes 15a in the plate portion 15 and that secure the transparent containers 4, such as Petri dishes, in an aligned state, between the holder portions 16 and the plate portion 15. The type of the sample holder 14 is detected by a sensor 39 provided on the motorized stage 5.

The plurality of containers 4 mounted on the sample holder 14 are accommodated inside a simple incubator 17 to maintain the culturing conditions therein (for example, humidity of 100% and $CO_2$ concentration of 0.5%). Reference sign 18 in the drawing is a phase-contrast condenser for phase-contrast observation.

The laser light source 6 is provided with a plurality of laser diodes 19 that emit laser light of different wavelengths, and a mirror 20 and dichroic mirror 21 that combine the laser beams emitted from the plurality of laser diodes 19 onto a single optical path.

The scanner 7 is, for example, a so-called proximity galvanometer mirror formed by placing two galvanometer mirrors that can be oscillated about mutually orthogonal axes so as to face each other.

The objective lens 8 is provided so as to be capable of switching between an objective lens 8a for dry observation and an objective lens 8b for oil-immersion or water-immersion observation by means of a revolver 8c. The objective lens 8 is provided with an autofocus function wherein the focal position is detected periodically or as required, and the objective lens 8 is moved in a direction parallel to the optical axis, thereby enabling the focal position of the objective lens 8 to be made coincident with the surface of the specimen.

Reference sign 22 in the figure is a pump for supplying immersion oil for oil immersion use or water for water immersion use to the space between the objective lens 8b and the bottom surface of the container 4, and reference sign 23 is an airbrush for removing the water or immersion oil.

A pupil-projection lens 24 and an image-forming lens 25 that focus the laser light scanned by the scanner 7 are disposed between the scanner 7 and the objective lens 8.

The image-acquisition unit 9, which is inserted between the laser light source 6 and the scanner 7, includes a beam splitter 26 that splits off, from the light path of the laser light, the fluorescence coming from the specimen and returning via the objective lens 8, the image-forming lens 25, the pupil-projection lens 24, and the scanner 7; a confocal lens 27 that focuses the fluorescence split off by the beam splitter 26; a variable pinhole 28; a collimator lens 29; a grating 30 that diffracts the fluorescence, converted to a collimated beam by the collimator lens 29, thus separating the fluorescence into each wavelength; a focusing lens 31 that focuses the fluorescence separated by the grating 30; a beam splitter 32 that splits the focused fluorescence into individual wavelengths; and light detectors 33 that detect the split fluorescences. The variable pinhole 28 is disposed in an optically conjugate positional relationship with the focal position of the objective lens 8. Reference signs 34 indicate pinholes.

Figure 3:
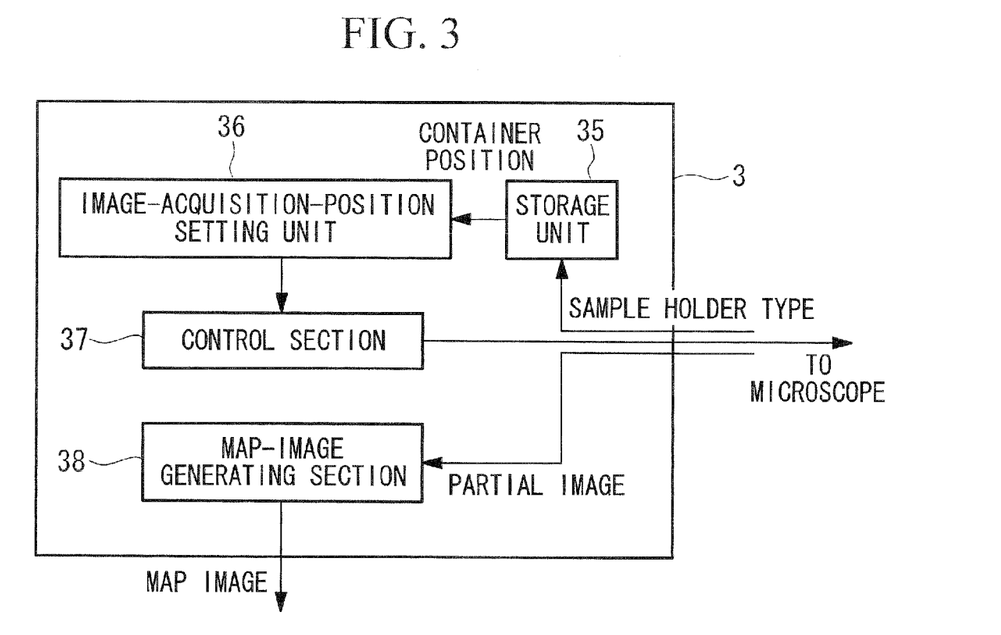
FIG. 3 is a block diagram showing a control unit of the microscope system in FIG. 1.

As shown in FIG. 3, the control unit 3 includes a storage unit 35 that stores the mounted positions of the containers 4 on the sample holder 14 in association with the types of the sample holders 14; an image-acquisition-position setting unit 36 that sets the acquisition positions where images are acquired on the basis of the mounting positions of the containers 4 stored in the storage unit 35 in association with the type of the sample holder 14 detected by the sensor 39; a control section 37 that controls the laser scanning microscope 2 so as to acquire a plurality of partial images Ga of partial regions formed by dividing the region inside each container 4, set at the acquisition position, into a plurality of regions; and a map-image generating section 38 that generates a map image G by arranging the plurality of acquired partial images Ga.

Examples of the mounting positions stored in the storage unit 35 are, for instance, center positions P of the through-holes 15a provided in the plate portion 15 of the sample holder 14. In the example shown in FIG. 4, the image-acquisition-position setting unit 36 sets the acquisition positions of 5×5=25 partial images Ga that are adjacent to each other, centered on the center position P of each through-hole 15a in the plate portion 15 of the sample holder 14 to which each container 4 is mounted.

The operation of the thus-configured microscope system 1 according to this embodiment will now be described.

With the microscope system 1 according to this embodiment, when the plurality of containers 4 are disposed on the sample holder 14 and mounted on the motorized stage 5, the type of the sample holder 14 is detected by the sensor 39 provided on the motorized stage 5, and the position information of the containers 4, which is stored in the storage unit 35, is read out on the basis of the detected type of the sample holder 14.

The image-acquisition-position setting unit 36 sets the image acquisition positions for acquiring the partial images Ga on the basis of the read out position information of the containers 4, and the control section 37 controls the laser scanning microscope 2 on the basis of the set acquisition positions.

In the laser scanning microscope 2, the laser light emitted from the laser light source 6 is two-dimensionally scanned by the scanner 7. The control section 37 controls the scanner 7 so that the scanning position and region of the laser light coincide with the acquisition position of each partial image Ga.

Because the laser light two-dimensionally scanned by the scanner 7 is focused onto the specimen inside the container 4 via the pupil-projection lens 24, the image-forming lens 25, and the objective lens 8, at the laser light irradiation position, a fluorescent substance present inside the specimen is excited, and fluorescence is produced. The fluorescence produced returns via the objective lens 8, the image-forming lens 25, the pupil-projection lens 24, and the scanner 7, is split off by the beam splitter 26, and enters the image-acquisition unit 9.

The fluorescence entering the image-acquisition unit 9 is focused by the confocal lens 27, and after only the fluorescence passing through the variable pinhole 28 is substantially collimated by the collimator lens 29, it is dispersed by the grating 30 and is detected by the light detectors 33 for different wavelengths via the focusing lens 31 and the beam splitter 32. By adequately narrowing down the variable pinhole 28, it is possible to allow only fluorescence coming from the focal position of the objective lens 8 to pass therethrough, and to be detected by the light detectors 33. Accordingly, it is possible to acquire a clear, blur-free confocal fluorescence image.

Figure 4:
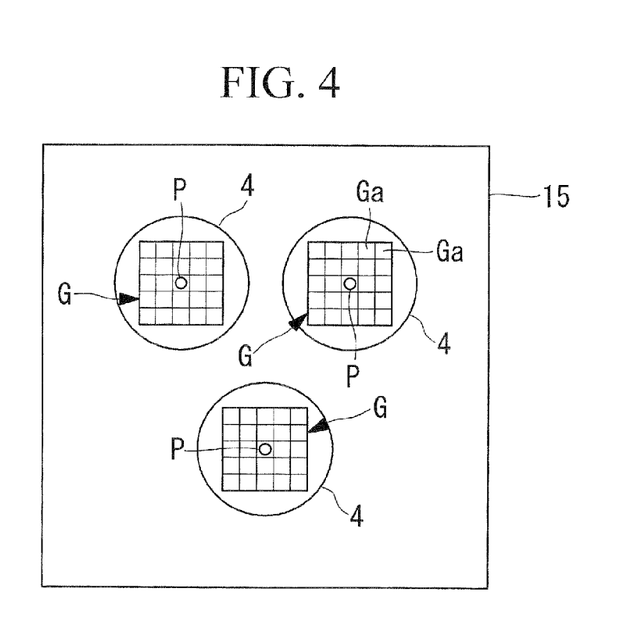
FIG. 4 is a plan view showing examples of partial images and map images acquired inside the containers held by the sample holder in FIG. 2.

The image-acquisition-position setting unit 36 sets the acquisition positions so as to acquire 5×5 partial images Ga that are adjacent to each other, centered on the center position P of the through-holes 15a in the plate portion 15 of the sample holder 14; therefore, 25 partial images Ga are acquired by the image-acquisition unit 9. Then, by operating the map-image generating section 38, the 25 acquired partial images Ga are arranged, thus generating a map image G that covers substantially the entire area of the container 4.

Additionally, because the image-acquisition-position setting unit 36 sets the acquisition positions of the partial images Ga in each container 4, for the plurality of containers 4, rather than acquiring superfluous images of regions other than the containers 4, the image-acquisition-position setting unit 36 acquires only the partial images Ga covering the required region inside the containers 4, which affords an advantage in that it is possible to generate the map image G with reduced waste, in a shorter time, and with low storage capacity.

In this embodiment, when acquiring partial images Ga of each container 4 with the laser scanning microscope 2, it is preferable that the control section 37 carry out focusing with the autofocus function at least one time for each container 4. By doing so, it is possible to eliminate needless acquisition of partial images Ga only in the focal plane where specimens do not exist.

The image-acquisition-position setting unit 36 may set the acquisition sequence of the plurality of partial images Ga. In other words, as shown by the arrows in FIG. 5, if the acquisition sequence were to be set so as to acquire neighboring partial images Ga in a sequence that rotates in one direction from substantially the center of the container 4, the partial images Ga would be acquired in an expanding fashion from substantially the center of the container 4 where the possibility of existence of a specimen is high.

Figure 5:
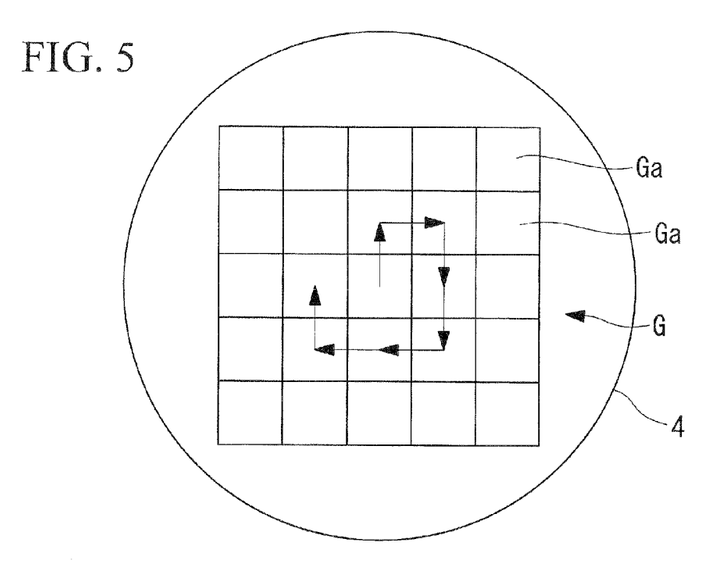
FIG. 5 is a plan view showing an example of the acquisition sequence of the partial images with the microscope system in FIG. 1.

Accordingly, it is possible to rapidly acquire the map image G in which the specimen exists, even though partial images Ga are not acquired over the entire region inside the container 4, and it is possible to acquire a valid map image G in a short period of time with a reduced number of acquired partial images Ga.

The image-acquisition-position setting unit 36 may set the acquisition sequence so as to acquire neighboring partial images Ga in a direction intersecting the multiple motion axes of the motorized stage 5. In other words, as shown by the arrows in FIG. 6, for example, by moving the motorized stage 5 at constant velocity in the two orthogonal axes X and Y simultaneously, the specimen can be moved in a direction forming an angle of 45° relative to the two motion axes. Therefore, merely by shifting the motorized stage on each motion axis by a distance $A/\sqrt{2}$, it is possible to move the motorized stage by distance A in a direction forming an angle of 45° relative to the motion axes, which can reduce the time required to move by approximately 30% compared with the case where the motorized stage is moved by the same distance A on a single motion axis.

Figure 6:
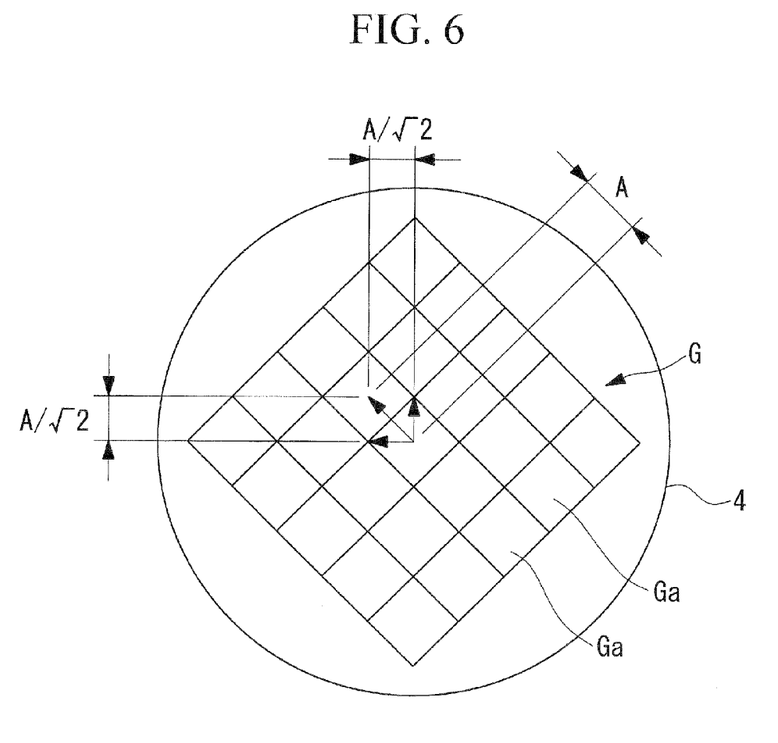
FIG. 6 is a plan view showing another example of the acquisition sequence of the partial images with the microscope system in FIG. 1.

In other words, when the motorized stage 5 is moved for acquiring the neighboring partial images Ga, it is possible to move the motorized stage 5 on multiple motion axes simultaneously, which affords an advantage in that it is possible to reduce the moving distance on each motion axis, to reduce the moving time, and to generate the map image G within a short period of time.

Figure 7A:
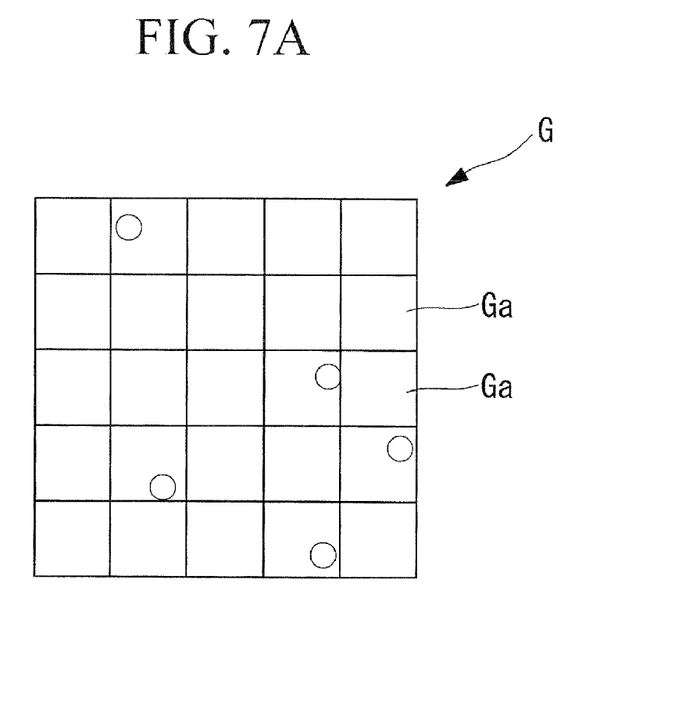
FIG. 7A is a plan view showing an example of the method of acquiring partial images with the microscope system in FIG. 1.
Figure 7B:
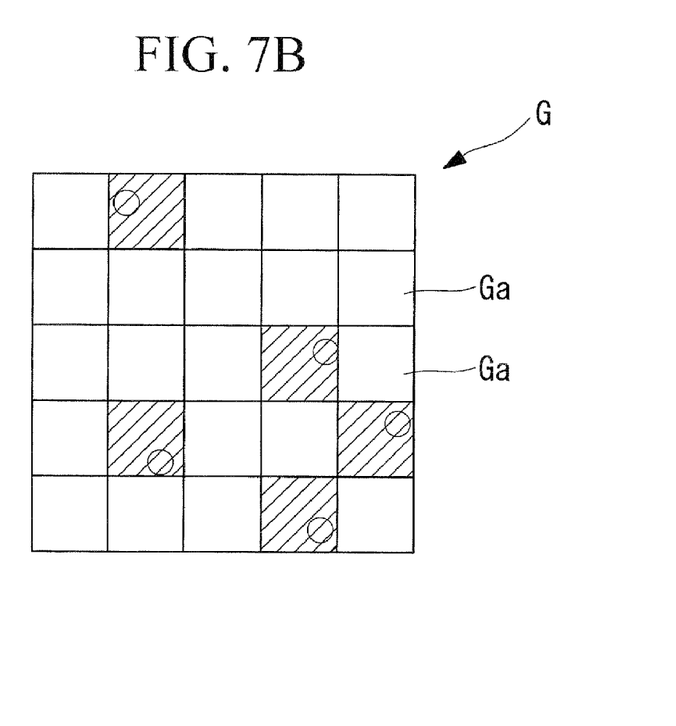
FIG. 7B is a plan view showing an example of the method of acquiring partial images with the microscope system in FIG. 1.

In this embodiment, when generating the map image G of a multi-stained specimen, as shown in FIG. 7A, after a plurality of partial images Ga are acquired in each container 4 for one fluorochrome, the control section 37 may control the laser scanning microscope 2 so as to acquire partial images Ga also for the other fluorochromes, only at the acquisition positions (hatched portions in FIG. 7B) of the partial images Ga where fluorescence exists in the acquired partial images Ga. Doing so affords an advantage in that it is possible to acquire a multi-stained map image G at a desired location within a shorter period of time compared with a case where partial images Ga of the entire region are acquired for a plurality of fluorochromes uniformly.

Figure 8A:
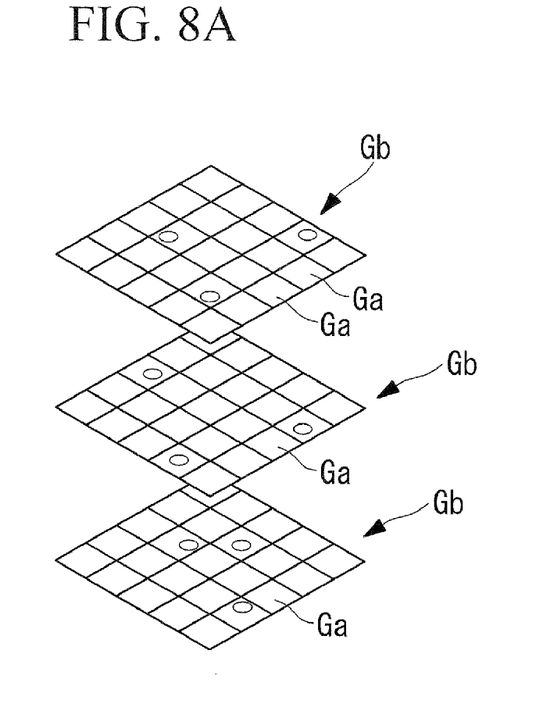
FIG. 8A is a perspective view showing another example of the method of acquiring partial images with the microscope system in FIG. 1.
Figure 8B:
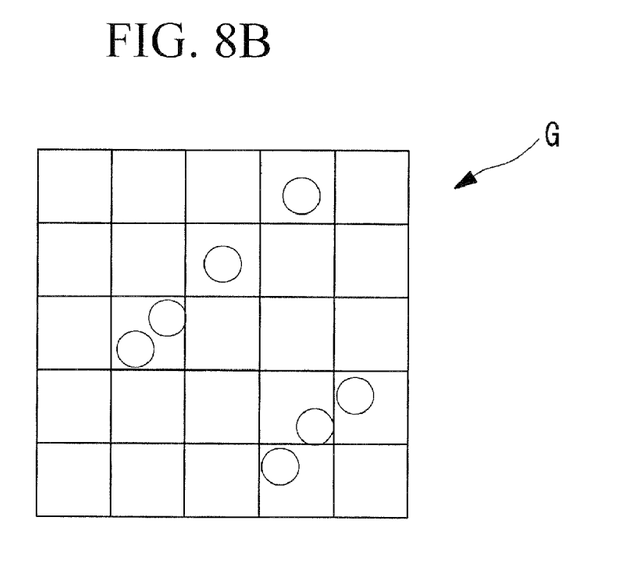
FIG. 8B is a plan view showing another example of the method of acquiring partial images with the microscope system in FIG. 1.

In this embodiment, as shown in FIG. 8A, the control section 37 may control the laser scanning microscope 2 so as to acquire a plurality of sets of partial images Gb at different focal positions of the objective lens 8 in the optical axis direction, and as shown in FIG. 8B, the map image generating section 38 may generate a map image G by combining the plurality of sets of acquired partial images Gb.

By doing so, it is possible to easily determine whether the specimen exists, from the combined map image G, even when the motorized stage 5 is tilted or when the positions at which the specimen exists are distributed in the optical axis direction of the objective lens 8.

In this embodiment, the control section 37 may control the laser scanning microscope 2 so that the depth of field is increased during acquisition of partial images Ga for generating the map image G. More specifically, the aperture diameter of the variable pinhole 28 may be increased, By doing so, it is possible to easily acquire partial images Ga in which the specimen exists, regardless of the positions of the specimen distributed in the optical axis direction of the objective lens 8, and it is possible to generate a map image G that allows easy determination of the presence of a specimen in an even shorter period of time than described above.

What is claimed is:

1. A microscope system comprising:
a microscope including a motorized stage on which is mounted at least one container that contains a specimen and which can adjust a position of the container, a scanner that scans laser light radiated onto the specimen in the container mounted on the motorized stage, an objective lens that focuses the laser light scanned by the scanner onto the specimen, an image-acquisition unit that acquires an image of the specimen by detecting fluorescence produced in the specimen by laser light irradiation with the objective lens, and a dark box that contains these components;
a storage unit that stores a mounting position of the container;
an image-acquisition-position setting unit that sets acquisition positions of partial images of inside of the container, to be acquired by the image-acquisition unit, based on the mounting position of the container stored in the storage unit;
a control section that controls the microscope so as to acquire a plurality of the partial images for each container based on the acquisition positions set by the image-acquisition-position setting unit; and
a map-image generating section that arranges the plurality of partial images acquired for each container to generate a map image.

2. A microscope system according to claim 1, wherein the control section controls the microscope so as to perform a focusing operation at least once for each container during acquisition of the partial images by the image-acquisition unit.

3. A microscope system according to claim 1, wherein the image-acquisition-position setting unit sets the acquisition positions so as to acquire neighboring partial images in a sequence rotating in one direction from substantially a center of the container.

4. A microscope system according to claim 1, wherein the motorized stage has a plurality of motion axes that intersect each other, and the image-acquisition-position setting unit sets the acquisition positions so as to acquire neighboring partial images in directions intersecting the plurality of motion axes.

5. A microscope system according to claim 1, wherein when generating the map image of a multi-stained specimen, the control section controls the microscope so that after a plurality of the partial images are acquired at each container for one fluorochrome, partial images are acquired for other fluorochromes at the acquisition positions of the partial images where fluorescence exists in the acquired partial images, and the map-image generating section generates the map image by combining the partial images acquired for the plurality of fluorochromes.

6. A microscope system according to claim 1, wherein the control section controls the microscope so as to acquire a plurality of groups of partial images at different focal positions of the objective lens in an optical axis direction, and the map-image generating section generates the map image by combining the acquired plurality of groups of partial images.

7. A microscope system according to claim 1, wherein the control section controls the microscope so as to increase a depth of field during acquisition of the partial images for generating the map image.

8. A microscope system according to claim 1, further comprising:
a sample holder which has a holder portion that holds the container and which is mounted to the motorized stage; and
a sensor that detects a type of the sample holder;
wherein the storage unit stores position information related to the holder portion of the sample holder, and the image-acquisition-position setting unit sets the acquisition positions of the partial images using the position information corresponding to the type of the sample holder detected by the sensor.

9. A microscope system according to claim 8, wherein the position information contains information indicating substantially a center of the container held in the holder portion, and the image-acquisition-position setting unit sets the acquisition positions and an acquisition sequence so as to acquire neighboring partial images in a sequence rotating in one direction from substantially the center of the container.

10. A microscope system according to claim 1, further comprising:
a sample holder which has a holder portion that holds the container and which is mounted to the motorized stage; and
wherein the storage unit stores position information related to the holder portion of the sample holder, and the image-acquisition-position setting unit sets the acquisition positions of the partial images using the position information stored in the storage unit.

* * * * *